The present invention relates to the use of binders of mixtures of copolymers of styrene, (meth)acrylates and an α,β-unsaturated carboxylic acid with triglycidyl isocyanurate for the electrostatic powder-spraying process, in which the coating powders which preferably have a grain size of from about 30 to 120μ and remain free-flowing at temperatures of at least 50° C. consist of (A) polymerized units of
  I. 25 to 60% by weight of styrene, α-methyl styrene, o-chlorostyrene, p-chlorostyrene, p-tert.-butyl styrene or mixtures thereof;
  II. 30 to 65% by weight of acrylic esters containing 1 to 12 carbon atoms in the alcohol radical or methacrylic esters containing 2 to 12 carbon atoms in the alcohol radical or mixtures thereof;
  III. 0 to 25% by weight of methacrylic acid methyl esters;
  IV. 3 to 15% by weight of acrylic acid, methacrylic acid, itaconic acid, maleic acid or fumaric acid, the total sum of the percentage contents I to IV amounting to 100 whilst the average molecular weight is between about 3000 and 20,000, (B) triglycidyl isocyanurate and may also contain
(C) additives such as pigments and levelling agents, and further by the fact that for 95 to 80 parts by weight of acrylic resin (A) there are 5 to 20 parts by weight of triglycidyl isocyanurate (B), and may also contain up to 150% by weight, based on (A) and (B), of pigments and from 0.1 to 5% by weight, based on (A), of a levelling agent.

In the context of the invention, the expression polymer powders covers not only copolymers with the composition defined above, but also mixtures of copolymers providing these mixtures are prepared in such a way that the overall composition lies within the aforementioned ranges.

The copolymers are produced by conventional bulk polymerisation, solution polymerisation, dispersion polymerisation and bead polymerisation processes, preferably by solution or bulk polymerisation. Processes of this kind are described for example in Methoden der Organischen Chemie, Houben-Weyl, 4th Edition, Vol. 14/1, pages 24–556 (1961).

In cases where polymerisation is carried out in solution, such solvents as methylene chloride, ethanol, isopropanol, n-propanol, n-butanol, isobutanol, tert.-butanol, acetic acid methyl up to butyl ester, acetone, methyl ethyl ketone, benzene, toluene, etc. can be used.

The polymerisation reactions are carried out at temperatures of from 40 to about 180° C.

Examples of suitable initiators include percarbonates, peresters such as tert.-butyl perpivalet and peroctoate, benzoyl peroxide, o-methoxy benzoyl peroxide, dichlorobenzoyl peroxide, azodiisobutyrodinitrile, being used in quantities of from 0.5 to 3% by weight, based on monomer.

The usual molecular weight regulators such as thioglycol, thioglycerin or tert.-dodecyl mercaptan, can also be used.

The solvent is removed from the copolymer solution in a suitable apparatus, preferably in evaporator screws, at temperatures of from about 90 to 180° C., followed by cooling, granulation and grinding, for example by the process disclosed in Belgian Patent Specification No. 762,586. However the copolymers can also be isolated by other methods, for example by spray drying, removal of solvent with steam accompanied by dispersion in water or by precipitation with water from a solvent miscible with water.

After they have been isolated, the copolymers can be mixed with up to 150% by weight and preferably with up to 100% by weight of inorganic or organic pigments, based on the copolymer, at temperatures of from 80 to 120° C. Examples of suitable pigments include titanium dioxide, iron oxides, chromium oxide, phthalocyanine and azo pigments.

Levelling agents such as silicones, polyesters, cellulose derivatives and also catalysts such as organic and inorganic acids, tertiary amines, dicyanodiamine and tin compounds can additionally be added to the melts (0.1 to 5% by weight, based on copolymer).

It is of course also possible to add pigments and levelling agents to the monomers before polymerisation or, in the case of solution polymerisation, to the copolymer solution before the solvent is removed from it.

The triglycidyl isocyanurate is preferably incorporated into the mixture in a mixing screw at temperatures of from 80 to 120° C. together with the pigments, levelling agents and catalysts. The mixing time should amount to between about 1 and 10 minutes. Prolonged mixing results in pre-crosslinking of the product. Under these conditions a homogeneous mixture which does not disintegrate, even when cooled, is obtained.

The solvent-free mixtures which may contain pigments and which in their uncrosslinked state, are brittle after cooling are ground to a grain size of from about 30 to 120μ and may be separated according to grain size.

The polymer powders used in accordance with the invention remain free-flowing at temperatures of up to at least 50° C., preferably 60° C., have levelling temperatures of from about 80 to 120° C. and are baked for 15 to 30 minutes at temperatures from about 130° C. to 220° C., preferably at temperatures of from 160 to 180° C., which baking results in cross-linking.

The polymer powders have average molecular weights of from about 3000 to 20,000 as measured in an organic solvent by the vapour-pressure reduction method.

The powders are applied to suitable substrates, especially metals, by conventional electrostatic powder-spraying processes (40 to 90 kv.), cf. D. R. Davis "Coating With Electrostatic Drey-Spray" in plastics technology, June 1962, pages 37–38.

The baked films (40 to 300μ thick) of the polymer powders used in accordance with the invention show outstanding bond strength and hardness coupled with elasticity. They are also distinguished by their high gloss and weather resistance.

The powders are used for coating domestic appliances, metal components in automobile construction and metal components exposed to heavy weathering, such as automobile bodywork, facade panels, tubes, wire netting and machines of the kind used in forestry and agriculture.

The production of the powders and their use as electrostatically sprayable powders are described in the following Examples in which the parts and percentages quoted relate to weight unless otherwise stated.

Production of the polymer powder 8 kg. of a monomer mixture consisting of 50 parts by weight of styrene, 35 parts by weight of butyl acrylate, 15 parts by weight of acrylic acid, 1 part by weight of tert.-dodecyl mercaptan and 0.005 part by weight of hydroquinone, are heated under nitrogen in a 40 litre vessel equipped with stirring mechanism until gentle refluxing begins. A temperature of from 130 to 140° C. is reached. A cooled mixture of 15 g. of tert.-butyl perpivalet in a petroleum fraction (b.p.$_{760}$ 70–130° C.) and 640 g. of the monomer mixture is introduced over a period of 1 hour into the initial monomer mixture, accompanied by polymerisation. The solids content now amounts to 80% (as determined by concentrating a sample by evaporation for 30 minutes at 250° C.). If the reaction becomes too vigorous, stopping the introduction of the initiator is sufficient to terminate polymerisation within a few seconds. A mixture of 16 kg. of monomer mixture and 160 g. of tert.-butyl perpivalet (the components are mixed together shortly before introduction in a vessel cooled with brine) is introduced into the melt over a period of 3 hours at 140 to 145° C., the reaction mixture heated to 160° C. on completion of the reaction and 180 g. of di-tert.-butyl peroxide and 180 g. of monomer mixture added dropwise over a period of another hour. The volatile constituents (catalyst decomposition products, monomer impurities) are then distilled off and the temperature subsequently kept at 170° C. for 2 hours. Thereafter, the melt is briefly degassed in vacuo and run off. The lacquer has a melting point of 95° C. and can be pulverised without lumping. It has an average molecular weight of approximately 6000, as determined by vapour-pressure reduction method (osmometry).

EXAMPLE 1

A resin produced by the process described above, consisting of copolymerised units of 50% by weight of styrene, 15% by weight of acrylic acid and 35% by weight of butyl acrylate, with a molecular weight of 6000 and a residual monomer content of less than 0.2% by weight, is ground to a grain size of about 300μ and mixed with 10 parts of weight of triglycidyl isocyanurate, based on 100 parts by weight of resin, and with 100 parts by weight, based on resin-hardener mixture, of titanium dioxide (rutile). The mixture is homogeneously mixed for 2 minutes in a pigmenting screw at a barrel temperature of 100° C. and an outlet temperature of 120° C., and the melt cooled by spreading it over cooling plates.

The melt cake is ground to a grain size of approximately 60μ in a breaker-plate mill. Even after storage for 48 hours at 55° C., the pulverised mixture is free-flowing and only lumps after heating to temperatures beyond 60° C.

The powder is electrostatically sprayed on to degreased iron plates in a conventional spraying machine under a voltage of 40 kv. (delivery pressure 0.8 atms). The coated plates are then heated for 30 minutes to 180° C. The films have a thickness of approximately 80μ. The films on the test plates have a Gardner gloss of 90° C., an Erichsen indentation of 8 mm. (DIN 53,156) and are unmarked after contact with a toluene-impregnated cotton wool pad followed by regeneration for 2 minutes.

EXAMPLE 2

The procedure is as in Example 1 except that a resin of the following composition is used: 25% by weight of styrene, 10% by weight of butylmethacrylate, 15% by weight of methylmethacrylate, 15% by weight of acrylic acid, 35% by weight of butyl acrylate. The polymer is prepared by the polymerisation process described in Example 1.

The following data were measured on plates coated electrostatically as in Example 1:

Erichsen indentation _____ 7 mm.
Gardner gloss _____ 95° C.
Solvent resistance _____ Unmarked by toluene after regeneration for 2 minutes.
Weather resistance _____ 700 hours in the Sunshine Weather-Ometer test.
Stability of the pigmented powder in storage _____ 48 hours at 55° C., no lumps.

EXAMPLE 3

95 parts by weight of a resin produced by the process as described above and consisting of copolymerised units of 57.5% by weight of styrene, 7.5% by weight of acrylic acid and 35% by weight of butylacrylate having an average molecular weight of 5500, measured by the vapour pressure osmometric method are mixed with 5 parts of triglycidyl isocyanurate, 0.2 parts by weight of stannous dioctoate and 20 parts by weight of carbon black, ground to a grain size of about 300μ and homogeneously mixed for 45 seconds in a pigmenting screw at 105° C., cooled and ground to a grain size of about 60μ. The powder is electrostatically sprayed as described above on a bicycle frame and backed for 15 minutes to 200° C. The film shows an outstanding high gloss and good resistance to petrol and weathering.

We claim:
1. A powdered coating agent comprising a mixture of:
(A) a copolymer of
  (I) 25–60% by weight styrene, α-methylstyrene, o-chlorostyrene, p-chlorostyrene, p-tert.-butylstyrene or mixtures thereof;
  (II) 30–65% by weight of acrylic acid esters having 1–12 carbon atoms in the alcohol residue or methacrylic esters having 2–12 carbon atoms in the alcohol residue or mixtures thereof;
  (III) 0–25% by weight methylmethacrylate; and
  (IV) 3–15% by weight of acrylic acid, methacrylic acid, itaconic acid, maleic acid, fumaric acid or mixtures thereof;

wherein the sum of the percentage contents of (I) to (IV) is 100 and the average molecular weight of said copolymer is 3000 to 20,000,
(B) triglycidyl isocyanurate and optionally
(C) auxiliary agents such as pigments and levelling agents wherein there are 95 to 80 parts by weight of said copolymer A to 5–20 parts by weight of said triglycidyl isocyanurate (B) as well as optionally not more than 150% by weight, based on (A) and (B) together, of pigments and 0.1 to 5% by weight, based on (A), of a levelling agent.

References Cited

UNITED STATES PATENTS

| | | | |
|---|---|---|---|
| 3,652,723 | 5/1972 | Fellers | 260—837 |
| 2,604,464 | 7/1952 | Segall | 260—837 |
| 3,215,756 | 11/1965 | Lombardi | 260—836 |
| 3,305,601 | 2/1967 | Hicks | 260—836 |
| 3,400,098 | 9/1968 | Parry | 260—837 |

FOREIGN PATENTS

| | | | |
|---|---|---|---|
| 773,206 | 4/1957 | Great Britain | 260—836 |
| 935,720 | 9/1963 | Great Britain | 260—837 |
| 941,732 | 11/1963 | Great Britain | 260—836 |

PAUL LIEBERMAN, Primary Examiner

U.S. Cl. X.R.

117—132 BE; 260—37 Ep, 41 B, 41 C, 824 Ep, 827, 835